United States Patent [19]

Jean-Claude

[11] Patent Number: 4,542,500
[45] Date of Patent: Sep. 17, 1985

[54] MULTIPLEXING AND DEMULTIPLEXING SYSTEM WITH JUSTIFICATION

[76] Inventor: Billy Jean-Claude, Saint Quay Perros, E-22700 Perros-Guirec, France

[21] Appl. No.: 671,030

[22] Filed: Nov. 14, 1984

Related U.S. Application Data

[63] Continuation of Ser. No. 349,014, Feb. 16, 1982, abandoned.

[30] Foreign Application Priority Data

Feb. 19, 1981 [FR] France .................................. 81 03688

[51] Int. Cl.$^4$ .............................................. H04J 3/07
[52] U.S. Cl. .................................................. 370/102
[58] Field of Search ...................... 370/102, 100, 112; 375/106, 112

[56] References Cited

U.S. PATENT DOCUMENTS

| | | | |
|---|---|---|---|
| 4,095,053 | 6/1978 | Duttweiler et al. | 370/102 |
| 4,132,862 | 1/1979 | Ferret et al. | 370/102 |
| 4,196,315 | 4/1980 | Boutmy et al. | 370/102 |
| 4,355,387 | 10/1982 | Portejoie et al. | 370/102 |
| 4,387,459 | 6/1983 | Huffman | 370/102 |

*Primary Examiner*—Douglas W. Olms
*Attorney, Agent, or Firm*—Laff, Whitesel, Conte & Saret

[57] ABSTRACT

The multiplexing system comprises a time base (29), a multiplexing unit (31) the output of which is connected to the high rate of delivery connection, synchronization units (25 to 28) which include phase comparing devices and which are connected to the low rate of delivery connections (Ve1 to Ve4), a common justification circuit (32) which delivers the reading clock for the synchronization units (25 to 28), a common circuit of justification authorization (33) the clock input (AJ) of which is connected to the corresponding part of time base (29), of which one governing output is connected to the governing input of the justification circuit (32) and the data output of which is connected to the governing input of a common inserting circuit (34) the data inputs of which are respectively connected to the outputs of the synchronization units (25 to 28) and the outputs (of which are connected) to the inputs of multiplexer (31) which delivers the plesiochronous numerical signals with a high rate of delivery.

The governing input of the common justification authorization circuit (33) is connected to the output of an OR gate (35) the inputs of which are connected to the corresponding outputs (Cph1 to Cph4) of the phase comparing devices in the synchronization units (25 to 28).

In the same manner, the demultiplexing system comprises a common dejustification circuit and a common reading circuit for the justification indications.

9 Claims, 5 Drawing Figures

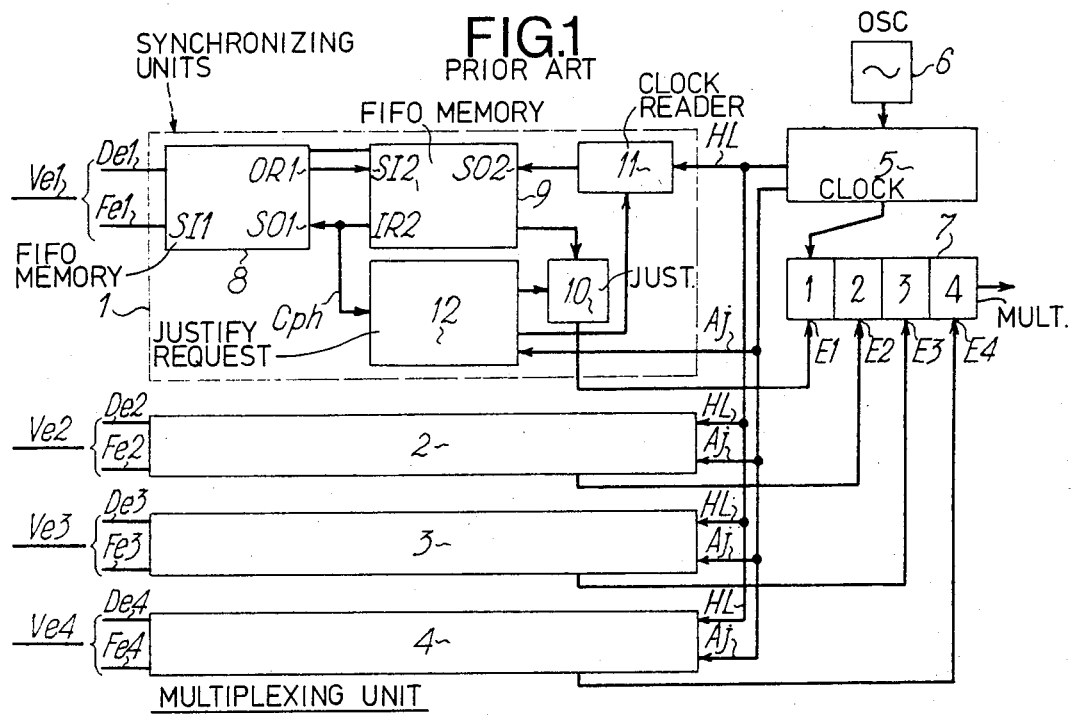
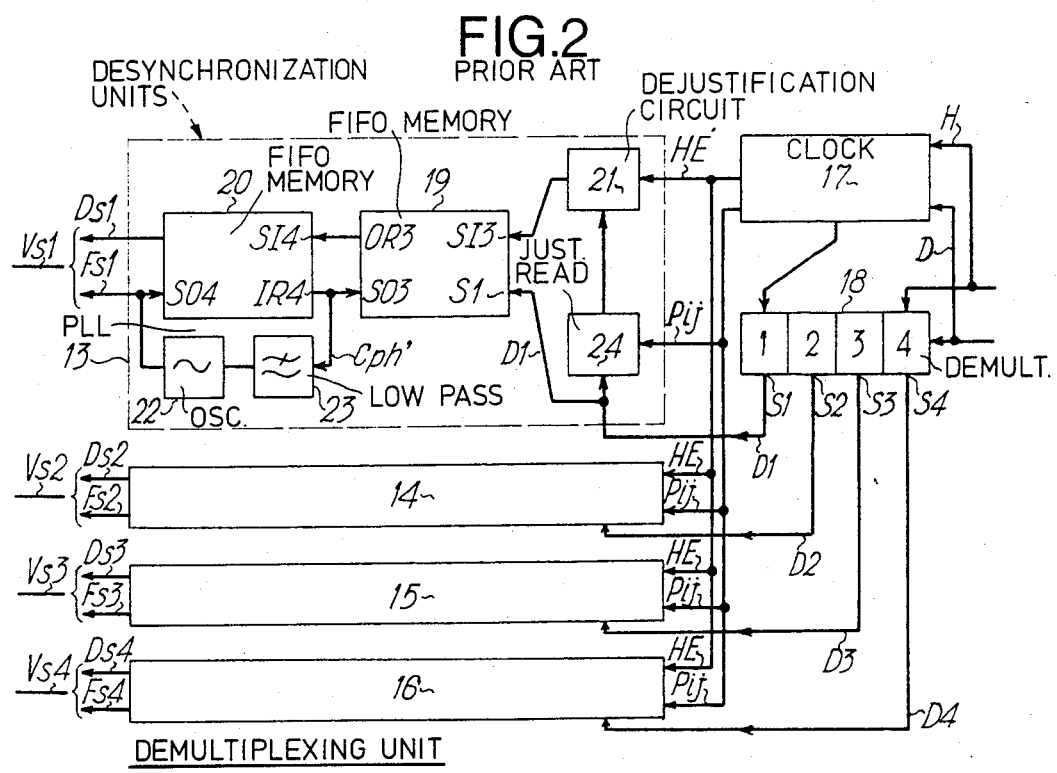

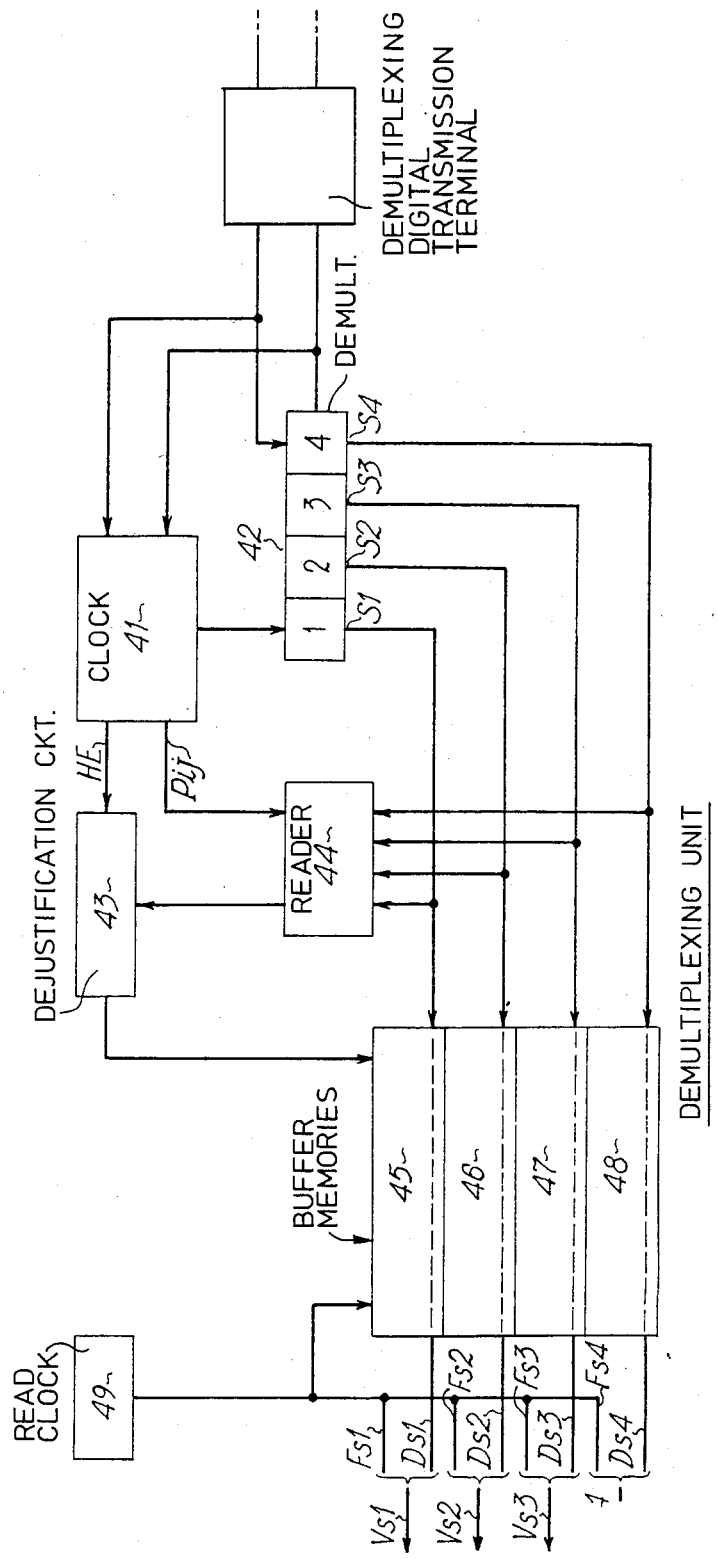

MULTIPLEXING AND DEMULTIPLEXING SYSTEM WITH JUSTIFICATION

This application is a continuation of now abandoned U.S. Ser. No. 349,014, filed Feb. 16, 1982.

The present invention relates to a system for multiplexing and demultiplexing with justification between low rate synchronous digital signals and high rate of plesiochronous digital signals.

In digital transmission networks, several hierarchic levels of multiplexing have been standardized. Thus, the European primary multiplex standards regroup thirty channels and has a bit rate of 2,048 Mbit/s. When four primary multiplexes are grouped, there is a multiplex of the second order which has a bit rate of 8,448 Mbit/s. When sixteen multiplexes of the second order are grouped, there is a tertiary multiplex (or sometimes called "the fourth order"), which has a bit rate of 139,264 Mbit/s. Between the multiplex of the second order and the teritary multiplex, there further is a level called of the third order, the bit rate of which is 34,368 Mbit/s.

It will be recalled that, in the simple case of the multiplexing of N digital signals having the same rate and being synchronous, if T is called the elementary time slot of those signals, the time multiplexing operation consists, first in giving to each bit of each signal a time slot $t=T/N$ and, second, in interweaving the thus reduced bits so as to obtain a multiplex digital signal in which the first bit comes from signal No. 1, the second bit from signal No. 2 . . . , the Nth bit from signal No. N, the (N+1) bit from signal No. 1, the (N+2) bit from signal No. 2, etc.

Presently, in actual networks, the multiplex, whatever may be their hierarchy level, are created from independent oscillations. They have a rhythm or clock rate located in a definite range around the common nominal rate of delivery. They are, therefore, plesiochronous. During a multiplexing operation, it thus becomes necessary to justify or correct the timing. As an example of a multiplexing and demultiplexing system of plesiochronous numerical signals with a low rate of delivery and justification, it is possible to cite the system described in U.S. Pat. No. 4,355,387. It will also be possible to refer to the following articles and pamphlets:

*TNM 1-2 Numerical Multiplexing Equipments Of The Second Generation And Associated Supervision Equipments*, by J. F. Portejoie, et al., which appeared in the technical French Journal, "Cables and Transmission", 32nd Year, No., April 1978, pp. 222 to 245.

*Numerical Multiplex Equipment For 8 And 34 Mbit/s Line Systems*, by S. Karlsson, et al., which appeared in the technical French Journal, "Ericsson Review", No. 2, 1978, pp. 76–83.

*Digital Multiplex Unit DSMX2/8 For The Conversion Of 4-2048 kbit/s to 8448 kbit/s, And Digital Multiplex Unit DSMX8/34 For the Conversion Of $4\times 8448$ kbit/x to 34368 kbit/s*, distributed by the Siemens Corporation.

One object of the present invention is to provide a multiplexing and demultiplexing system in which the lower rate digital signals are synchronous while the higher rate numerical signals are plesiochronous.

According to a feature of the invention, there is a multiplexing system with justification between low rate synchronous numerical signals and high rate plesiochronous numerical signals, comprising in the conventional manner, a time base or clock. A multiplexing unit has an output which is connected to the high rate output and synchronization units comprising phase comparing units and connected from the low rate input lines. A common justification circuit delivers the clock pulse rate for reading the synchronization units. A common justification authorizing circuit has a clock input which is connected from the corresponding output of the time base or clock. One control output of this authorizing circuit is connected to the control input of the justification circuit, the data output of which is connected from the input of a common insertion circuit for inserting the justification indicator bits, the data inputs of which respectively are connected from the outputs of the synchronization units and the outputs which are connected to the inputs of the multiplexing unit which delivers the high rate signals. There is further provided a control input of the common justification authorization circuit which is connected from the output of an OR gate, the inputs of which are connected from the corresponding outputs of the phase comparing devices in the synchronization units.

According to another feature, instead of a phase comparing device in each synchronization unit and of the OR gate, the system comprises a clock error detection circuit, the inputs of which are connected to the write clock inputs of the synchronization units. The detection circuit has as many outputs as inputs, to which it transmits the corresponding input signals. A switching selector of one of the outputs of the detection circuit operates toward the input of a common phase comparison means. The detection circuit further comprises a control output which is connected to the control input of the selector. The second input of the phase comparison means is connected from the output of the justification circuit and its output to the control input of the justification authorization circuit.

According to another characteristic, there is a demultiplexing system with dejustification between the high rate plesiochronous numerical signals with low rate synchronous numerical signals, comprising in the conventional manner, a time base or clock. A demultiplexing unit is connected from the high rate line and desynchronization units are connected to the low rate lines. A common dejustification circuit is further provided, the clock input of which is connected from a corresponding output of the time base or clock and the output of which delivers the writing clock pulses of the desynchronization units. A circuit leads the justification indications having a clock input which is connected from the corresponding output of the time base or clock. Data inputs correspond to the outputs of the demultiplexing device. A control output is connected to the control input of the dejustification circuit, the inputs of the synchronization units being connected from the corresponding outputs of the demultiplexing unit.

The above-indicated characteristics of the invention, as well as others, will more clearly appear upon a reading of the following description of embodiments of the invention, the description being given in relationship to the attached drawings wherein:

FIG. 1 is a schematic block-diagram of a multiplexing unit which belongs to the state of the art;

FIG. 2 is a schematic block diagram of a demultiplexing unit which belongs to the state of the art;

FIG. 5 is a block-diagram of a variation of a demultiplexing unit according to the present invention.

Figure 3:
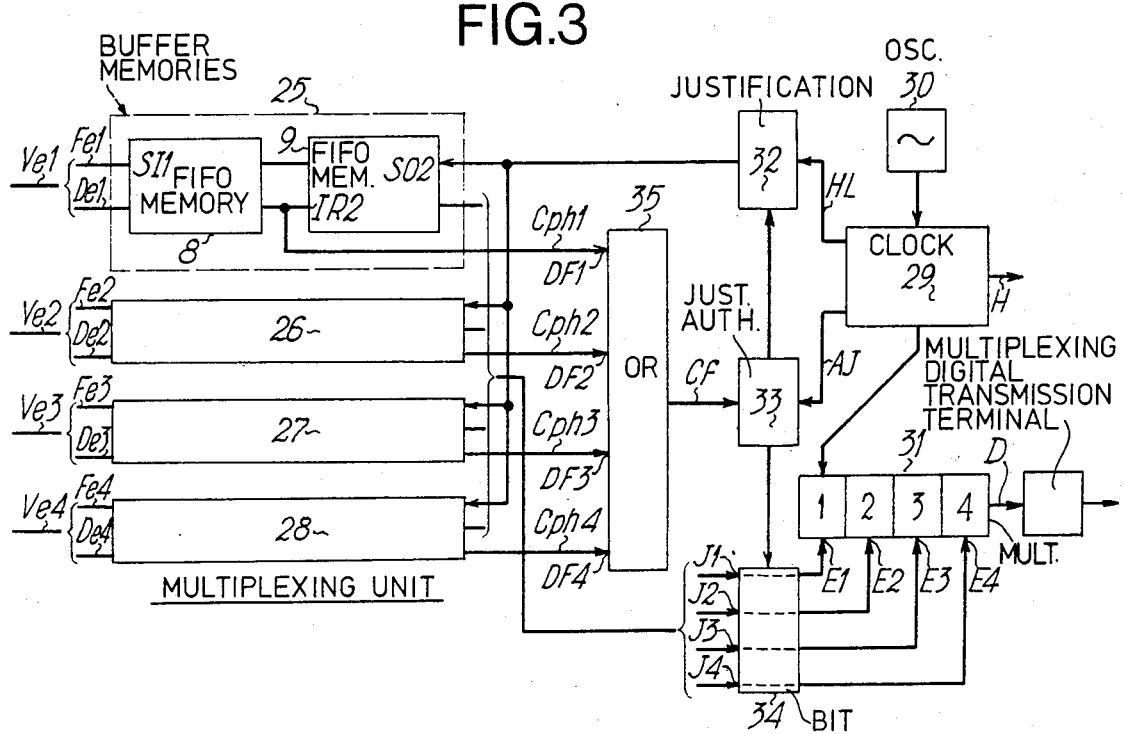
FIG. 3 is a block-diagram of a multiplexing unit according to the present invention.

In the multiplexing unit according to FIG. 1, there are four synchronization units 1 to 4, a clock or time base 5, associated with an oscillator 6, and a multiplexing circuit 7. Each synchronization unit 1 to 4, respectively, is associated with a multiplex input channel with a low rate of delivery, Ve1 to Ve4. Each path or channel Ve1 to Ve4 respectively comprises a numerical signal input wire De1 to De4 and a clock input wire Fe1 to Fe4.

As in French Pat. No. 2,450,008, (U.S. Pat. No. 4,355,387, granted Oct. 19, 1982), synchronization unit 1 comprises two FiFo memories 8 and 9, assembled in series. The data input of memory 8 is connected to the De1 input signal, while its input SI1 is connected to the clock input Fe1. The data output of FiFo memory is connected to the data input of FiFo memory 9, the data output of which is connected to the input of a circuit for the inserting of the justification binary elements, circuit 10. The output OR1 of FiFo memory 8 is connected to the input SI2 of the FiFo memory 9, the output IR2 of which is connected to the input SO1 of FiFo memory 8. Input SO2 of FiFo memory 9 is connected to the output of a reading clock circuit 11, the input HL of which is connected to an output of clock or time base 5. Moreover, output IR2 of FiFo memory 9 is connected to an input of the justification requesting memory 12, a governing or control input of which is connected to the output Aj of the time base 5. An output of circuit 12 is connected to a governing input of the justification inserting circuit 10, while another output is connected to a governing input of clock circuit 11. The output of circuit 10 is connected to an input E1 of the multiplexing circuit 7, the reading of which delivers the high rate of delivery multiplexed signal.

The other synchronization units 2 to 4 have structures identical to that of unit 1.

The Cph signal of output IR2 of the FiFo memory 9 characterizes the phase variation between the Fe1 and HL clocks. Wire HL carries the clock signal for the synchronization of the four channels to be multiplexed, and for the reading of the informations. Aj is the signal for justification authorization, which also indicates the position of the justifications. Multiplexing device 7 performs the synchronous multiplexing of the four outputs of justification circuit 10 and it inserts the systematic binary elements, such as those of the scan locking words, the reserve bits, etc.

In the case of FIG. 1, in which the signal to be multiplexed are plesiochronous, one synchronization unit per channel is required to be multiplexed. For each one of the component channels, justification is done upon request and it is a function of the phase differences between the reading clock supplied by circuit 11 and the data writing clock Fe1 to Fe4. Since clocks Fe1 and Fe4 are not synchronous, the justifications are independent in synchronization units 1 to 4.

In the demultiplexing unit in FIG. 2, there are four desynchronization units 13 to 16, a time base 17, and a demultiplexing circuit 18. Each desynchronization unit 13 to 16 respectively is associated with a low rate of delivery multiplex output path channel Vs1 to Vs4. Each path or channel Vs1 to Vs4 respectively comprises a numerical signal output wire Ds. to Ds4 and a clock output wire Fs1 to Fs4.

As in French Pat. No. 2,450, 008 (U.S. Pat. No. 4,355,387, granted Oct. 19, 1982), the desynchronization unit 13 comprises two FiFo memories 19 and 20, assembled in series. The data input of memory 19 is connected to the output S1 of demultiplexing unit 18, while its input S13 is connected to the output of a dejustification circuit 21. The data output of the FiFo memory 19 is connected to the data input of FiFo memory 20, the data output of which is connected to wire Ds1. The OR3 output of FiFo memory 19 is connected to the input S14 of FiFo memory 20, the output IR4 of which is connected to the input SO3 of FiFo memory 19. Input SO4 of FiFo memory 20 is connected to the output of an auxiliary oscillator 22, the governing or control input of which is connected to the output of a low-passing filter 23, the input of which is connected to the output IR4 of FiFo memory 20. One input of the dejustification circuit 21 is connected to an output HE of the clock or time base 17, while its governing or control input is connected to the output of a justification indications reading circuit 24. A clock input Pij of circuit 24 is connected to a corresponding output of clock or time base 17, while its data input is connected to the output S1 of demultiplexing unit 18. The other desynchronization units 14 to 16 are structures identical to those of unit 13.

The signal Cph' of output IR4 of FiFo memory characterizes the result of the phase comparison between the writing clock 21 and the clock delivered by oscillator 22. Circuit 21 receives from clock or time base 17 the writing clock of the received data and it delivers to input S13 the dejustified writing clock of path or channel VS1. Signal Pij delivered by clock or time base 17 indicates the position of the justification indications. Time base or clock 17 is synchronized in the scanning field by the received signal and it produces the different signals necessary to the demultiplexing device. The demultiplexing device 18 performs a synchronous demultiplexing.

The phase locking loop constituted by memory 20, oscillator 22 and filter 23 makes it possible to smooth the clock rate or rhythm "with holes" which occur after demultiplexing the resulting signal, dejustification, and an elimination of the justification binary elements and of the elements which served to form the scanning field.

As will be seen below, when the paths or channels to be multiplexed or to be demultiplexed are synchronous, it is possible to simplify the equipments and, by the same token, to improve their performances.

In the multiplexing unit represented in FIG. 3, the low rate of delivery multiplex input paths or channels Ve1 to Ve4 are found, which now are assumed to be synchronous. The paths or channels respectively comprise data transmission wires De1 to De4 and clock transmission wires Fe1 to Fe4. In the multiplexing unit, the paths or channels Ve1 to Ve4 are respectively connected to the inputs of buffer memories 25 to 28. The multiplexing unit further comprises a clock time base 29, which is guided by a local oscillator 30 which supplies the rhythm or clock pulses of the multiplexed signal, a multiplexing unit 31, a justification circuit 32, a justification authorization circuit 33, a circuit 34 for the inserting of the binary elements or bits of justification indication, and an OR circuit 35. Each buffer memory 25 to 28 comprises two FiFo memories 8 and 9 which are assembled in series in exactly the same manner as the memories 8 and 9 in FIG. 1.

Thus, in memory 25, the data input of memory 8 is connected to the signal input De1, while its input SI1 is connected to the clock input Fe1. The data output of FiFo memory 9 is connected to an input J1 of circuit 34 for inserting the binary elements or bits of justification indication. Input SO2 of memory 9 is connected to the output of justification or reading clock circuit 32. Output IR2 of memory 9 is connected to an an input DF1 of the OR gate 35. In practice, the buffer memories 25 to 28 are capable of absorbing the jiggle which each component signal may present, as well as the phase variations between their writing clocks Fe1 to Fe4 and the reading clock delivered by circuit 32.

The circuit for the insertion of the binary elements of justification indications, circuit 34, comprises four data inputs J1 to J4, respectively connected to the data outputs of buffer memories 25 to 28, four data outputs respectively connected to the inputs E1 to E4 of multiplexing unit 31, and a governing input connected to a corresponding output of the justification authorization circuit 33.

The OR gate 35 comprises four inputs DF1 to DF4 respectively connected to the outputs IR2 of memories 9 of the buffer memories 25 to 28, and a Cf output connected to the governing intake of the justification authorization circuit 33.

Clock circuit 32 comprises a clock input HL connected to the corresponding output of the clock or time base 29, a governing or control input connected to the corresponding output of circuit 33 and four outputs in parallel respectively connected to the reading clock input of buffer memories 25 to 28. One input of circuit 33, further, is connected to the output AJ of the time base or clock 29.

The phase comparison signals Cph1 to Cph4 applied by the buffer memories 25 to 28 to inputs DJ1 to DJ4 of the OR gate 35 translate the phase differences between the synchronous writing clocks Fe1 to Fe4 and the reading clock of justification circuit 32. The output signal Cf of the OR gate 35 translates a justification request made on one of the entering paths or channels. Signal Cf is treated by circuit 33, as signal Cph in FIG. 1 is treated by circuit 12, and it governs the justification which is translated by the elimination of one clock time in circuit 32. Thus, synchronization between the writing clocks Fe1 to Fe4 and the reading clock is by means of a justification on request, but which is common to the four paths or channels to be multiplexed.

The Table below shows, as an example, the structure of a scan used for the standardized delivery of 8448 kbit/s, delivered by a multiplexing unit of synchronous signals.

TABLE

|  | GR1 bitJ of IJ | GR2 bitJ of IJ | GR3 bitJ of IJ |  |
| --- | --- | --- | --- | --- |
| word of VT 121234 | 123451234 | 12341234 | 12341234 | word of VT |
| Sector 1 | Sector 2 | Sector 3 | Sector 4 |  |

In the scanning field following a request for justification, the three groups GR1, GR2, GR3 of justification indication IJ assume the same binary value "1". Therefore, the four binary elements of justification BitJ of paths or channels 1 to 4 will be the filling binary elements. The information they contain will not be taken into account at the time of the demultiplexing.

As stated above, each buffer memory 25 to 28 must be capable of absorbing the phase differences between the writing and reading clocks. Those phase differences result from the structure of the scanning field used and from the jiggle which may exist on the component signals. As an example, in the case of multiplexing unit TNM 2-8 Mbit/s, the maximum phase difference corresponds to $12/4 = 3$ binary elements or bits, which corresponds to the passage of the hole at the location of the locking word VT. If the jiggle reaches 10 bits, peak to peak, the capacity of FiFo memories 8 and 9 will be at least equal to $3+10+2=15$ binary elements, the last two bits ensuring security.

Figure 4:
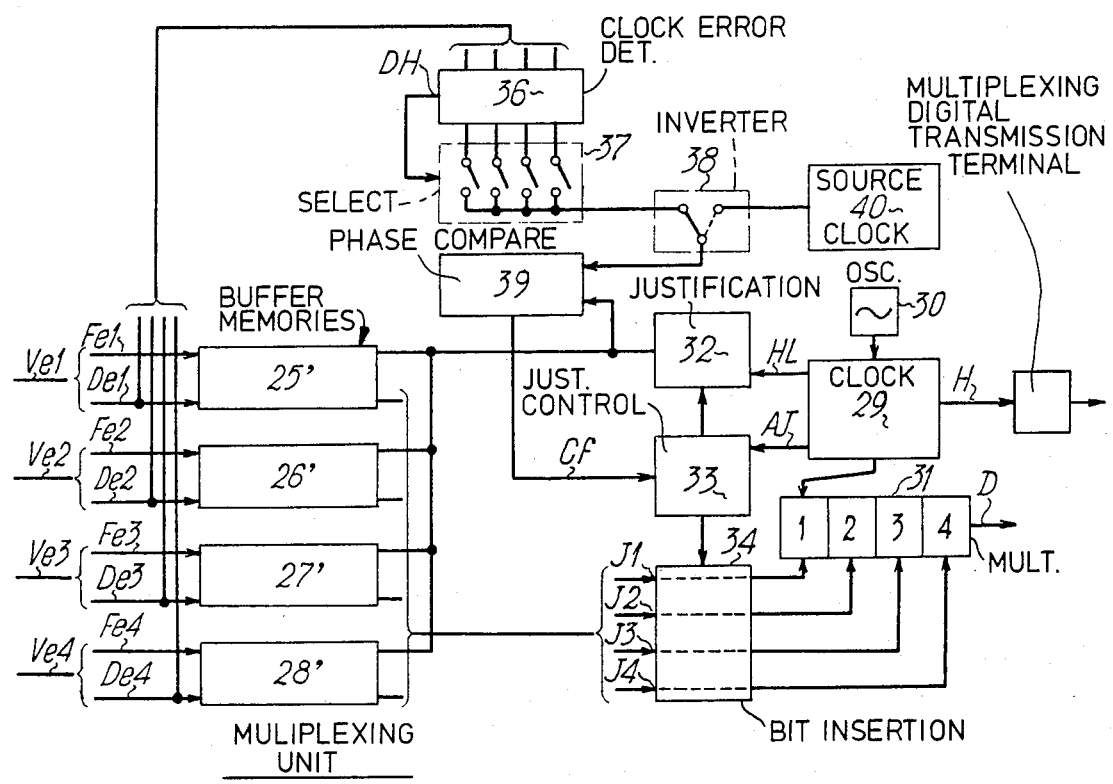
FIG. 4 is a block-diagram of a variation of a multiplexing unit according to the present invention.

In the multiplexing unit represented in FIG. 4, the synchronous multiplex input paths or channels are found again with a low rate of delivery, Ve1 to Ve4, with their data transmission wires De1 to De4 and their clock transmission wires Fe1 to Fe4. The paths Ve1 to Ve4 are respectively connected to the inputs of the buffer memories 25' to 28'. The multiplexing unit further comprises a time base 29, a local oscillator 30, a multiplexing unit 31, a justification circuit 32, a justification authorization circuit 33 and a circuit 34 for the inserting of the binary elements of justification indication. Circuits 29 to 34 are connected among themselves and they function as do those in FIG. 3.

Input wires Fe1 to Fe4 are respectively connected to the four corresponding inputs of a clock error detecting circuit 36, which comprises as many outputs as it has inputs, plus one governing output DH. The clock outputs of circuit 36 are connected to the signal inputs of a selector 37, the governing input of which is connected to the output DH of circuit 36 and the output of which is connected to a terminal of an inverter 38, the movable contact of which is connected to a first input of a phase comparing device 39. The other fixed contact of inverter 38 is connected to a source of clock 40. The second input of comparing device 39 is connected to the output of circuit 32, while its output is connected to the input Cf of circuit 33.

Buffer memories 25' to 28' may be simple FiFo memories, rather than FiFo memories assembled in series, as is the case in the embodiment in FIG. 3.

Circuit 36 and selector 37 make it possible to obtain, in the multiplexing device, a local clock which is synchronous with the clocks of the component signals, but which can, with respect to those signals, have different jiggle characteristics. Circuit 36 can, in practice, be a supervision circuit, of the type described in the article in the journal "Cables and Transmissions" indicated above, or in the same journal, issue of December 1975, pages 299 to 307. Or, it even may be a capacitor which is charged by clock impulses, the charge of which exceed a given value when the clock pulse is present, and falls below that value when the clock pulse is absent. Instead of using the output of selector 37 which thus delivers a recovered clock, it is also possible to use the local source 40 which delivers a synchronous signal of the clock pulses of the component signals. The choice between the two solutions, when it exists, that is to say, when source 40 is present, is done by switching, by hand, for example, the contact of inverter 38. The use of the local source 40 can simplify the embodiment of the systems of clock recovery at each component signal. In addition, local source 40 further can be used to transmit special alarm signals, such as the sending of the synchronous standardized alarm indication signal SIA, the binary value of which is "all 1" (t out of 1), in place of the content of a failing component path.

In practice, source 40 is a clock created outside of the circuit in FIG. 4, and which is synchronous with the received component signals. Although it is synchronous with those signals, it may present different electrical characteristics, especially in jiggle. It must be noted that signal SIA must be synchronous with the absent component signals; therefore, it requires a justification from source 40.

In the embodiment in FIG. 4, the phase comparing device 39 makes a single comparison between the local clock transmitted by inverter 38, the delivery of which is Fe, and the reading clock delivered by justification circuit 32, the delivery of which is F1. The signal delivered by phase comparing device 39 corresponds to the signal Cf which was delivered by the OR gate 35 in the example in FIG. 3. The justification operations are, at each Cf signal which is sent, carried out as in the example in FIG. 3.

In the demultiplexing unit in FIG. 5, there are a time base or clock 41, a demultiplexing unit 42, a justification circuit 43, a circuit 44 for the simultaneous reading of the justification indications of four paths or channels to be demultiplexed, four buffer memories 45 to 48, which constitute the desynchronization units, and a reading clock source 49. Each desynchronization unit 45 to 48 is respectively associated with a multiplex output path or channel Vs1 to Vs4 which has a low rate of delivery. Each Vs1 to Vs4 path respectively comprises a numerical signal output wire Ds1 to Ds4, and a clock wire Fe1 to Fs4.

The data input of memory 45 is connected to the output S1 of demultiplexing unit 42, while its writing clock input is connected to the output of the dejustification circuit 43. The data output of memory 45 is connected to wire Ds1 of the multiplex output path or channel Vs1. The reading clock input of memory 45 is connected to the clock source 49, as well as to wire Fs1 of path or channel Vs1. Circuit 44 is connected, by four corresponding inputs, to the connection wires between the outputs S1 to S4 of 42, and the units 45 to 48. Circuit 44 simultaneously reads those inputs to detect the justification indications, which are located at very specific locations in each scanning field. From the simultaneous readings, circuit 44 makes a logical decision on the basis of a majority criterion and the logical decision either authorizes or does not authorize a dejustification which then affects the four paths or channels to be demultiplexed. The majority decision offers an additional protection against transmission errors. It must be noted that the time base 41 communicates to circuit 44 the positions of the justification indications through the connection Pij. Circuit 44 is connected to circuit 43 which receives the clock from time base 41 in order to ensure that the clock delivered by dejustification circuit 43 really corresponds to the useful binary elements which have been demultiplexed.

The source of reading clock 49, in practice, is constituted by circuit 37 or circuit 40 of the multiplexing unit in FIG. 4.

In practice, memories 45 to 48 may be constituted by FiFo memories.

Of course, instead of clock source 49, it is possible to obtain the clock for the reading of the desynchronization units, through the use of conventional locking loops. However, the use of the available source in the multiplexing unit makes it possible to reduce the means, and therefore, to reduce the complexity and the cost.

The signals from Ds1 to Ds4, read by the local clock pulses of source 49, are sent without any residual jiggle (assuming that the local is not jiggling), a fact which represents an advantage relative to the plesiochronous demultiplexing units. Now, it is well known that, in plesiochronous systems, the low frequency residual jiggle, called waiting time jiggle and resulting from the dejustifications, is cumulative in the course of successive multiplexings and demultiplexings.

Source 49, which may be source 40, also makes it possible for the demultiplexing to perform the smoothing of the whole group of "with holes" components obtained after demultiplexing and justification.

Those who are skilled in the art will readily perceive how to modify the invention. Therefore, the appended claims are to be construed to cover all equivalent structures which fall within the true scope and spirit of the invention.

I claim:

1. A multiplexing system with justified conversion from low rate synchronous digital signals to high rate plesiochronous digital signals, said system including time base clock circuit means, multiplexer means having an output coupled to a high rate transmission line, a plurality of synchronization means respectively connected to receive signals from a low rate transmission line, common justification circuit means having write clock signals for supplying clock signals to said synchronization means, a common justification control circuit having a clock input connected to a corresponding output of the time base clock circuit means, common justification bit insertion circuit means, a control output being connected to a control input of the common justification circuit means and data output being connected to a control input of a common justification bit insertion circuit means, said bit insertion circuit means having data inputs which are individually associated with outputs of the synchronization means and which deliver high rate plesiochronous digital signals, two input comparator means, local clock source means synchronized responsive to an applied low rate synchronous digital signals, the control input of the common justification control means being connected to the output of said comparator means, one input of said comparator means being connected to the output of the common justification circuit means and another input being connected to an output of said local clock source means, said local clock source means being independent of said low rate synchronous digital signals insofar as jitter is concerned.

2. The system of claim 1 wherein each of said synchronization means has write clock input means and phase comparator means, local clock source means comprised of a clock failure detection circuit means having inputs connected to said write clock inputs of said synchronization means, said clock failure detection circuit means having as many outputs as inputs and applying respectively to each output the clock signal applied to the corresponding input, and switching means for selectively switching one of the outputs of said clock failure detection circuit means to an input of said phase comparator means, said clock failure detection circuit means further having a control output connected to a control input of the switching means.

3. A system according to claim 1 wherein each of said synchronization means has write clock input means and phase comparator means, local clock source means comprised of a clock failure detection circuit means having inputs connected to said write clock inputs of said synchronization means, said clock failure detection circuit means having as many outputs as inputs and applying respectively to each input the clock signal applied to the corresponding input, and switching means for selectively switching one of the outputs of said clock failure detection circuit means to an input of said phase comparator means, said clock failure detection circuit means further having a control output connected to a control input of the switching means, wherein each of the synchronization means inherently have phase comparators respectively, and outputs of said phase comparators in said synchronization means being respectively connected to inputs of an OR gate, the output of which is connected to the control input of the common justification control means.

4. The multiplexing system of claim 1 and digital transmission terminal means coupled to the output of the system of claim 1, said terminal comprising means for multiplexing low rate synchronous digital signals for forwarding plesiochronous signals in a multiplexing system and for demultiplexing return high rate plesiochronous digital signals.

5. The multiplex system of claim 1, and digital transmission converter means coupled to the output of the system of claim 1, said converter means comprising means for multiplexing low rate synchronous digital signals to forward high rate plesiochronous digital signals and for demultiplexing return high rate plesiochronous digital signals to low rate synchronous digital signals in a demultiplexing system.

6. A demultiplexing system with dejustification from high rate plesiochronous digital signals to convert them to a low rate synchronous digital signals, said demultiplexing system being associated with and receiving signals from a multiplexing system with justified conversion from low rate synchronous digital signals to high rate plesiochronous digital signals in response to a common justification circuit means having a bit insertion circuit with data inputs which are individually associated with outputs of a synchronization means to deliver a high rate justified plesiochronous digital signals responsive to a local clock source which is independent of said low rate synchronous digital signals insofar as jitter is concerned, said demultiplexing system comprising: a time base clock means, demultiplex means connected to receive signals from a high rate transmission line and a plurality of desynchronization means connected to transmit to a low rate transmission line, said demultiplexing system further including a common dejustification circuit means having a clock input connected to a corresponding output of the time base clock and an output which delivers write clock signals to said desynchronization means, justification indication readout circuit means having a clock input connected to outputs of said demultiplexer means and to a control input of said common justification circuit means, data inputs of said desynchronization means being connected to outputs of the demultiplexer means, and said desynchronization means having read clock inputs connected to the output of the local clock source means.

7. The demultiplex system of claim 6 and a digital transmission terminal means coupled to the input of the system of claim 6, said terminal means comprising means for demultiplexing high rate plesiochronous digital signals and forwarding them in a low rate synchronous digital demultiplexing system.

8. The demultiplex system of claim 6 and a digital transmission converter means coupled to the input of the system of claim 6, said converter means comprising means for demultiplexing high rate plesiochronous digital signals to provide low rate synchronous digital signals and forwarding them to a demultiplexing system.

9. A digital transmission terminal with justified two-way conversion between low rate synchronous digital signals and high rate plesiochronous digital signals, said system including digital send means and digital receive means;

said send means comprising: time base clock circuit means, multiplexer means having an output coupled to a high rate plesiochronous line for transmission of digital signals at a nominal rate subject to natural deviation, a plurality of synchronization means respectively connected to receive signals from a low rate transmission line, common justification circuit means having write clock signals for supplying clock signals to said synchronization means, a common justification control circuit having a clock input connected to a corresponding output of the time base clock circuit means, common justification bit insertion circuit means, a control output being connected to a control input of the common justification circuit means and data output being connected to a control input of a common justification bit insertion circuit means, said bit insertion circuit means having data inputs which are individually associated with outputs of the synchronization means which deliver high rate plesiochronous digital signals, two input comparator means, local clock source means synchronized responsive to an applied low rate synchronous digital signals, the control input of the common justification control means being connected to the output of said comparator means, one input of said comparator means being connected to the output of the common justification circuit means and another input being connected to an output of said local clock source means, said local clock source means being independent of said low rate synchronous digital signals insofar as jitter is concerned;

said receive means comprising: a time base clock means, demultiplex means connected to a high rate plesiochronous line for reception of digital signals at said nominal rate subject to said natural deviation and a plurality of desynchronization means connected to a low rate transmission line, said demultiplexing system further including a common dejustification circuit means having a clock input connected to a corresponding output of the time base clock and an output which delivers write clock signals to said desynchronization means, justification indication read-out circuit means having a clock input connected to outputs of said demultiplexer means and to a control input of said common justification circuit means, data inputs of said desynchronization means being connected to outputs of the demultiplexer means, and said desynchronization means having read clock inputs connected to the output of the local clock source means.

* * * * *